Patented Oct. 1, 1929

1,729,809

UNITED STATES PATENT OFFICE.

KARL FRIEDRICH WILHELM, OF STRALSUND, GERMANY

PROCESS OF EXTRACTING FATTY ACIDS, RESINS, BITTER SUBSTANCES, AND MUCILAGE FROM OILS AND FATS

No Drawing. Application filed September 15, 1927, Serial No. 219,812, and in Germany May 2, 1927.

This invention relates to a process of extracting fatty acids, resins, bitter substances, and mucilage from oils and fats, and has for its object to render the process more effective. In his American Patent 1,616,292 applicant disclosed a process of extracting fatty acids from oils and fats consisting in mixing them with an aqueous alcohol-ammonia-solution, whereby the fatty acids are neutralized and extracted as ammonia soaps dissolved in alcohol.

The present invention consists in adding to the oils and fats to be deacidified, in addition to an aqueous alcohol-ammonia-solution, approximately the same quantity of a fat solvent such as trichlorethylene, methylene chloride, benzine etc. immiscible with acqueous alcohol-ammonia-solution, and in thoroughly mixing the composition preferably while it is warm. After mixing, approximately 1 per cent Glauber's salt previously dissolved in some aqueous alcohol-ammonia-solution is added, and the composition mixed again. Oils and fats dissolved in benzine and subjected to this treatment will separate completely and in a very short time from the aqueous alcohol-ammonia-solution while the mucilage is separated from both the neutral oil-benzine-solution and the aqueous alcohol-ammonia-solution and caused to form a special dense layer. By applying the process just recited all oils and fats will be deacidified and freed from mucilage in a far more rapid and thorough manner than is possible by adopting any other known method.

The following examples illustrate the invention:

Example I 100 kilos of a vegetable or animal oil containing approximately 15 per cent of free fatty acid are mixed with about 100 kilos of benzine. To this mixture are added about 150 kilos of aqueous alcohol containing ammonia, the solution comprising about 50 per cent of water, about 50 per cent of alcohol, and about 3 per cent of gaseous ammonia. The entire compound is then thoroughly mixed at about 50° centrigrade until complete emulsification sets in. To this emulsion is added about 1 per cent of Glauber's salt previously dissolved in 10 times the amount of aqueous alcohol-ammonia-solution, whereupon the whole compound is mixed again and then allowed to stand for a while. Within a short time the alcohol-ammonia-soap-solution will separate at the bottom while the separated mucilage and the neutral oil dissolved in benzine will form two super-imposed separate layers. The lower layer of alcohol-ammonia-soap-solution is drawn off into a special vessel wherein alcohol and ammonia are removed by distillation and fatty acid and Glauber's salt remain as residue. The mucilage, which forms now the bottom layer and which contains small amounts of neutral oil, benzine, and alcohol-ammonia, is drawn off also into a special retort in which benzine and alcohol are eliminated by distillation and the residual mucilage is drained off. The last layer comprising the neutral oil dissolved in benzine is then drawn off into a retort whereupon the benzine is removed by distillation so that pure neutral oil remains.

Example II 100 kilos of a crude vegetable or animal oil containing approximately 30 per cent of free fatty acid are mixed with about 100 kilos of trichlorethylene. To this mixture are added about 150 kilos of aqueous alcohol containing ammonia, the solution comprising about 50 per cent of water, about 50 per cent of alcohol, and 3 per cent of gaseous ammonia. The entire compound is then thoroughly mixed at about 50° centigrade until complete emulsification is effected. To this emulsion is added about 1 per cent of Glauber's salt previously dissolved in 10 times the amount of aqueous alcohol-ammonia-solution, whereupon the whole compound is mixed again and then allowed to stand for awhile. Within a short time the neutral oil dissolved in trichlorethylene will separate at the bottom while the separated mucilage and the alcohol-ammonia-soap-solution will form superimposed separate layers. The neutral oil and its trichlorethylene contents are drawn off, and the latter is then removed by distillation. The mucilage is also freed by distillation from its small contents of trichlorethylene and alcohol-ammonia while the slime is drained. Then the alcohol-ammonia-soap-solution is distilled to yield alcohol-ammonia while the fatty acid together with the crystallized Glauber's salt forms the residuum.

I claim:—

The process of extracting fatty acids, resins, bitter substances, and mucilage from oils and fats consisting in adding a volatile fat solvent to the oils and fats to be deacidified and freed from mucilage, treating the mixture with an aqueous alcohol-ammonia-solution, mixing the compound thus formed preferably while it is warm, adding approximately 1 per cent of Glauber's salt previously dissolved in 10 times the amount of aqueous alcohol-ammonia-solution, mixing again the entire compound preparatory to allowing it to stand to form superimposed layers of alcohol-ammonia-solution, mucilage, and oil-containing solvent, drawing off the said layers separately, removing by distillation the volatile fat solvent from the last layer and recovering the purified neutral oil.

In testimony whereof I have affixed my signature.

KARL FRIEDRICH WILHELM.